J. O. STANLEY.
CLUTCH DEVICE FOR STARTING EXPLOSIVE ENGINES.
APPLICATION FILED DEC. 7, 1912.
1,114,304. Patented Oct. 20, 1914.
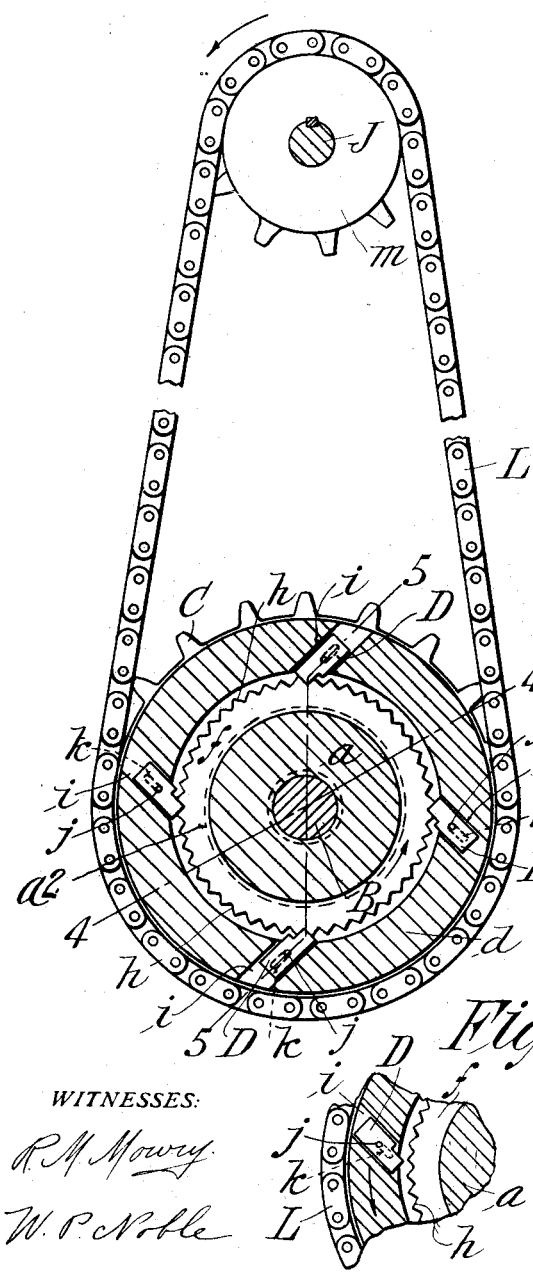
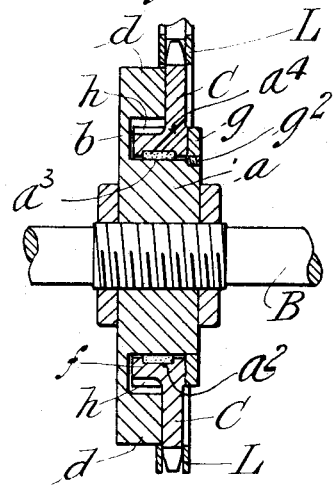
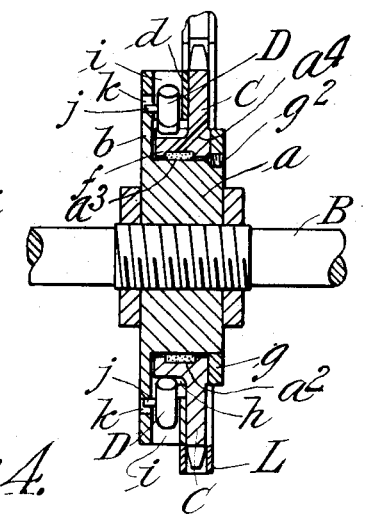
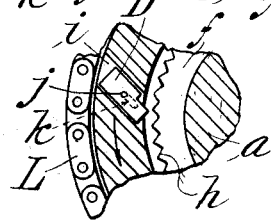
WITNESSES:
INVENTOR,
John O. Stanley,
BY
ATTORNEY.

UNITED STATES PATENT OFFICE.

JOHN O. STANLEY, OF HOLYOKE, MASSACHUSETTS, ASSIGNOR TO B. F. PERKINS & SON, INCORPORATED, OF HOLYOKE, MASSACHUSETTS, A CORPORATION OF MASSACHUSETTS.

CLUTCH DEVICE FOR STARTING EXPLOSIVE-ENGINES.

1,114,304.  Specification of Letters Patent.  Patented Oct. 20, 1914.

Application filed December 7, 1912. Serial No. 735,448.

*To all whom it may concern:*

Be it known that I, JOHN O. STANLEY, a citizen of the United States of America, and resident of Holyoke, in the county of Hampden and State of Massachusetts, have invented certain new and useful Improvements in Clutch Devices for Starting Explosive-Engines, of which the following is a full, clear, and exact description.

This invention relates to a clutch device especially designed for the starting of an explosive engine through a hand crank, and has for its object to provide an improved device of this nature that is simple, efficient and conveniently operable, and which will automatically be thrown out of connection with the engine shaft as soon as the latter becomes operative by the explosion of the engine.

The invention is described in conjunction with the accompanying drawings and is set forth in the claim.

In the drawings:—Figure 1 is a sectional view of the device looking rearwardly. Fig. 2 is a cross section on the line 4—4 of Fig. 1. Fig. 3 is a similar sectional view on the line 5—5 of Fig. 1; and Fig. 4 is a partial sectional view on the same plane as Fig. 1 but showing the changed relation of the pawl to the teeth of the wheel.

Similar characters of reference indicate corresponding parts in all of the views.

On the engine shaft is rigidly affixed a disk comprising a hub portion $a$ and a radially extending flange portion $b$ which at its outer portion is provided with an annular rib $d$ extending transversely and parallel with its axis, and being concentric with, and having a separated but surrounding relation to, the hub $a$.

Inasmuch as the precise formation last described is not essential, the element comprising the hub $a$, its radially outwardly extending flange $b$ and the annular rim or rib-like portion $d$, will be hereinafter in this specification and in the claim termed a "frame."

The frame hub $a$ is made with an internal annular channel $a^2$ within which a wick or strip $a^3$ of absorbent material is accommodated, an oiling hole $a^4$ affording convenient means and introducing oil from time to time to the wick; and thus providing a means for efficiently lubricating the relatively movable parts.

C represents a sprocket wheel loosely and rotatively mounted on the hub portion $a$ of the frame,—the inner face of the sprocket wheel being in contact with, or very close to, the face of the annular rib $d$ of the frame, while its axially extending hub portion $f$ is located in the annular chamber between the hub and annular rib of the frame.

The sprocket wheel, the teeth of which project outwardly beyond the circumference of the frame rib $d$, is held against displacement by the confining ring $g$ detachably secured to the frame hub $a$ by the screw $g^2$.

The hub $f$ is provided with V-shaped teeth $h$ on its periphery for pawl engagement.

The annular rib $d$, comprised as part of the engine shaft-carried frame, has pawl-guiding apertures $i$ therein, the lengths of which instead of being radial are at angles of about 45 degrees to the radial. The pawl bar D slidably engaged in each guiding aperture $i$ has an outwardly projecting stud $j$ which engages in a slot $k$ in the flange $b$ of the frame.

Above the engine shaft is a stand G, journaled for rotation in the upper portion of which is a comparatively short countershaft J having a sprocket wheel $m$ affixed thereon.

A sprocket chain L has a running engagement around both the countershaft sprocket wheel $m$ and the aforementioned sprocket wheel C.

The countershaft is equipped with means for imparting rotative motion thereto in the starting direction, that is clockwise, the same most advantageously being a crank M, and preferably a "safety crank" as known in the art, that employed by me being of the construction illustrated and described in an application for Letters Patent of the United States filed by me Sept. 28, 1912, No. 722,869; although, of course, this invention is not limited to that particular safety crank, as other cranks having the susceptibility of being thrown out of connection or engagement with the starting shaft when the engine back fires and reversely kicks, may be utilized.

When the engine and its shaft are motionless, as well as is also the starting device, more or less of the pawl bars D which are freely slidable in the apertures $i$ will gravitatively engage, each by its end, one of the V-teeth, and by its side portion near its end another of the V-teeth peripherally on the hub of the sprocket wheel C.

When it is desired to start the motionless engine, the crank on the countershaft is turned, and the running of the sprocket chain in the direction of the arrows, Fig. 3, causes the teeth $h$ in engagement against the sides of the pawls, and which pawls are transversely resisted each by one side wall of the aperture $i$, to force the frame around, thereby rotating the engine shaft; and as even in the initial portion of the starting action, the revolution of the sprocket wheel V-teeth is not exceedingly rapid, all the pawls will, one after another, gravitatively come to their engagements, and once engaged, be held so by the crowding action of the parts. But the engine started, whereupon its shaft will rotate much more rapidly than had been the case in the "cranking up" action, causes the "frame" to run away ahead of the pawl bars D, causing them to be automatically crowded out of engagement with the V-teeth of the sprocket wheel hub, and so that immediately the engine shaft assumes its rapid rotation as usual in its running the sprocket wheel C, the chain L, sprocket wheel $m$, countershaft J, and crank M will have lost all connection with the engine shaft and further need of forwardly driving the starting device will have ceased.

Of course, in case of a back kick, provision against injury to the person operating the device is afforded by the safety crank M.

It will be appreciated that the pawl bars D having outward sliding movements in the recesses $i$ in sufficient extents as limited by the stud and slot engagements, will, under their revoluble movements in the frame while the engine shaft is rapidly running, be, by centrifugal force, held with their inner engaging ends free and clear from the V-teeth of the then stationary sprocket wheel C so that unnecessary wear between these parts is prevented and so that there is also an avoidance of noise which would be incidental to the clicking of the revolubly moving pawls past the V-teeth.

I claim:—

In a mechanism of the character described, in combination, an engine shaft having a circular frame affixed thereto which comprises a circular hub portion and a radially outwardly extending flange having an annular rib projecting parallel with its axis, such rib having pawl-guiding apertures therein inclined to the radius of the hub, a sprocket wheel having its inward face positioned alongside the face of said rib and provided with a hub portion loosely encircled by said rib, which hub portion has a series of V-shaped teeth, a ring detachably secured to the hub portion of the circular frame and confining the sprocket wheel against displacement from the latter, and a plurality of pawl bars one freely slidable in each said aperture and having a stud-and-slot engagement with the frame flange, and adapted to have engagement with one of said hub teeth by its end and to have engagement with the next hub tooth by its side portion adjacent such end.

Signed by me at Holyoke, Mass., in presence of two subscribing witnesses.

JOHN O. STANLEY.

Witnesses:
JAMES McKAY.
F. C. KEENS.